United States Patent
Sauvinet et al.

(10) Patent No.: US 11,434,088 B2
(45) Date of Patent: Sep. 6, 2022

(54) DEVICE FOR SUPPORTING A GLASS SHEET, PARTICULARLY IN A WASHING FACILITY

(71) Applicant: SAINT-GOBAIN GLASS FRANCE, Courbevoie (FR)

(72) Inventors: Vincent Sauvinet, Grenoble (FR); Thierry Olivier, Thourotte (FR); Philippe Frebourg, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 87 days.

(21) Appl. No.: 16/091,693

(22) PCT Filed: Apr. 5, 2017

(86) PCT No.: PCT/FR2017/050808
§ 371 (c)(1),
(2) Date: Oct. 5, 2018

(87) PCT Pub. No.: WO2017/174934
PCT Pub. Date: Oct. 12, 2017

(65) Prior Publication Data
US 2019/0161290 A1 May 30, 2019

(30) Foreign Application Priority Data
Apr. 6, 2016 (FR) .................................. 1653034

(51) Int. Cl.
*B65G 49/06* (2006.01)
*B08B 11/04* (2006.01)

(52) U.S. Cl.
CPC ............ *B65G 49/061* (2013.01); *B08B 11/04* (2013.01); *B65G 49/064* (2013.01)

(58) Field of Classification Search
CPC .. B65G 49/063; B65G 49/064; B65G 49/061; B65G 2249/04; B65G 49/067;
(Continued)

(56) References Cited

U.S. PATENT DOCUMENTS 2,190,440 A * 2/1940 Beebe .................... C25D 17/08
    204/297.1
3,520,457 A * 7/1970 Augustin .............. C03B 33/033
    225/2
(Continued)

FOREIGN PATENT DOCUMENTS

DE     10 90 396 B     10/1960
DE   20 2008 011687 U1   10/2008
(Continued)

OTHER PUBLICATIONS

International Search Report as issued in International Patent Application No. PCT/FR2017/050808, dated Aug. 11, 2017.

*Primary Examiner* — Mahdi H Nejad
(74) *Attorney, Agent, or Firm* — Pillsbury Winthrop Shaw Pittman LLP (57) ABSTRACT

A device for holding and capable of conveying a sheet of glass includes a holder intended to support the sheet of glass, in particular in a substantially horizontal position, wherein the device includes a surround including a plurality of support elements which are able to support the sheet of glass locally.

19 Claims, 3 Drawing Sheets

(58) Field of Classification Search
CPC ... C25D 17/06; C25D 17/08; H01L 21/68735; H01L 21/68721; H01L 21/68707; C23C 16/4585; B08B 11/04
See application file for complete search history.

(56) References Cited

U.S. PATENT DOCUMENTS

| | | | |
|---|---|---|---|
| 3,973,943 A | | 8/1976 | Seymour |
| 6,101,689 A | * | 8/2000 | Jo ............................ A45F 5/02 24/332 |
| 10,770,324 B2 | * | 9/2020 | Kuenanz ................. C23C 14/34 |
| 2005/0076934 A1 | * | 4/2005 | Suzuki ................. B08B 7/0057 134/1 |
| 2005/0218003 A1 | * | 10/2005 | Wang ................. H01L 21/6838 205/157 |
| 2008/0286084 A1 | * | 11/2008 | Ho ....................... B65G 49/064 414/749.6 |
| 2010/0059478 A1 | * | 3/2010 | Lee .................... H01L 21/68735 216/71 |
| 2015/0042026 A1 | * | 2/2015 | Uemura .................... A45D 8/20 269/43 |
| 2016/0009992 A1 | * | 1/2016 | Deng ..................... C09K 13/08 216/83 |
| 2016/0096278 A1 | * | 4/2016 | Cho ........................ F16B 47/00 294/185 |
| 2017/0225323 A1 | * | 8/2017 | Barber ................. B25J 15/0616 |
| 2019/0035661 A1 | * | 1/2019 | Nakatani ............ H01L 21/67051 |
| 2019/0071264 A1 | * | 3/2019 | Shinzaki ................. F16C 13/02 |
| 2020/0165066 A1 | * | 5/2020 | Harada ............. H01L 21/67706 |

FOREIGN PATENT DOCUMENTS

| | | |
|---|---|---|
| EP | 0 725 023 A1 | 8/1996 |
| WO | WO 2015/014410 A1 | 2/2015 |

* cited by examiner

DEVICE FOR SUPPORTING A GLASS SHEET, PARTICULARLY IN A WASHING FACILITY

CROSS-REFERENCE TO RELATED APPLICATIONS

This application is the U.S. National Stage of PCT/FR2017/050808, filed Apr. 5, 2017, which in turn claims priority to French patent application number 1653034 filed Apr. 6, 2016. The content of these applications are incorporated herein by reference in their entireties.

The invention relates to a device for holding a sheet of glass, particularly in a horizontal position, in particular in an assembly comprising a conveying device, and in a washing facility for sheets of glass traveling on a conveying device.

The invention will be described more particularly with reference to an application of holding, during washing and drying, a sheet of glass intended to be conveyed through the washing and drying facility, without, however, being restricted thereto. It could apply to any application requiring a sheet of glass that is to be transported or handled to be held, particularly in a (substantially) horizontal position, before it is integrated into its final end-use.

The invention applies more particularly to a curved sheet of glass, particularly for automotive applications, and of very small thickness, under 1.2 mm or even under 1.1 mm, without, however, being restricted thereto and may apply to any sheet of glass for other types of vehicle or even other applications.

These days reducing the weight of motor vehicles is one of the avenues being explored by manufacturers in order in particular to reduce the consumption of fossil fuel of vehicles and therefore reduce the emissions of greenhouse gases ($CO_2$).

Of all the constituent elements of a vehicle, the glazing is one of the components where weight reductions are being sought. One of the steps in reducing the weight of glazing is to reduce the thickness of the glass. Hence, glazings, in particular windshields are now being proposed in which the interior sheet of glass has a thickness of less than 1.2 mm or even less than 1.1 mm, such as of 0.7 mm or 0.55 mm or even 0.4 mm or 0.3 mm.

During the manufacture of laminated glazing, such as automotive glazing, the pair of curved sheets of glass that are to be sandwiched together with a film of transparent plastic has to undergo a washing operation in order to avoid the presence of dust which would otherwise carry the risk of becoming entrapped within the laminate, generating visible defects that would not be admissible given the quality imposed in the automotive field, and would lead to the glazing being scrapped.

The cleaning of the curved sheets of glass is usually performed in washing tunnels, the sheets of glass passing one behind the other along a conveying device provided with two parallel and spaced-apart belts, being laid on said belts via their edge face, at four points if the sheet of glass is symmetric, or at three points if its contour is asymmetric. Washing and drying are performed over the entire surface area of the two opposite faces of the sheet of glass and on the periphery thereof, by spraying pressurized water jets followed by pressurized air jets, the fact that the sheets of glass are positioned on edge allowing the entire surface and periphery of the sheets of glass to be cleaned.

However, sheets of glass with a thickness of the order of 1.4 mm or less subjected to the pressure of the water and air jets vibrate and deform, the amplitude of the vibrations being considerably increased as the thickness of the glass decreases. Specifically, the amplitude of vibration increases as much as the bending strength of the sheet of glass decreases, in proportion with the cube of the thickness of the sheet of glass. Thus, vibrations with an amplitude of the order of 20 mm are observed under the effect of the jets of drying air for a sheet of glass of thickness 1.4 mm, and reach respectively 40 mm and even 160 mm for glass with respective thicknesses of 1.1 mm and 0.7 mm. The vibrations cause the glass to knock against the blowing nozzles and generate significant shocks on the edge face of the glass resting on the conveyer belts giving rise to rupture initiators and causing the sheets of glass to break.

Water and air pressure adjustments and nozzle alignment do not make it possible to obtain satisfactory stability or to eliminate shocks for sheets of glass of very small thickness, below 1.2 mm. There is too much breakage of the sheets of glass.

It is therefore an object of the invention to propose a device for holding a sheet of glass, the device being capable of conveying, which obviates the aforementioned disadvantages while allowing the sheet of glass to be held firmly while allowing the conveying thereof and optimal washing of the surface of the two faces of the sheet of glass, including the periphery of the sheet of glass, and secondarily while being able to be used in existing conveying and washing facilities.

According to the invention, the device for holding and capable of conveying a sheet of glass comprises holding means which are intended to support the sheet of glass, in particular in a (substantially) horizontal position, and is characterized in that it comprises a surround comprising a plurality of support elements which are able to support the sheet of glass locally. The support elements are secured to the surround removably or non-removably.

The surround allows the sheet of glass to be supported by its underside face, at points that are localized and while leaving the periphery of the sheet of glass free.

The surround also constitutes a means of conveying for the sheet of glass.

Thus, on the one hand, the sheet of glass can be conveyed via the surround which bears the sheet of glass and, on the other hand, the sheet of glass is held while at the same time remaining free of any frame surrounding its periphery, which means to say without the peripheral edge of the sheet of glass being enclosed in the surround. Furthermore, the support elements arranged exclusively in a localized manner avoid contact over a continuous surface of the glass, allowing optimal washing because of the limited nature of said area of contact.

The device for holding and capable of conveying a sheet of glass guarantees:
stabilized transportation for all sheets of glass;
protection of the edge face of the sheets of glass against any contact or shocks;
distribution of supports over the entire periphery of the glazing, forming the least possible impediment to access by the water and the air to the entirety of the surface and periphery of the sheets of glass.

In the remainder of the description, the terms "horizontal", "vertical", "upper", "lower", "top", "bottom", are to be understood to qualify elements of the device or of a sheet of glass when the device is resting fixedly on a horizontal plane and when the sheet of glass is associated with it also extending horizontally.

The term "height" when qualifying an element of the device is to be understood as meaning the vertical dimension, namely in a direction perpendicular to the horizontal plane containing the surround.

As a preference, the surround is intended to surround the sheet of glass at some distance away therefrom, and the support elements are associated as projections from the interior contour of the surround. This configuration affords better access to the underside surface of the sheet of glass during washing, better clearing of water droplets during drying and vertical compactness of the support.

In another alternative form, the surround bears the support elements in a plane coplanar with its upper face or in a plane situated above its upper face, when the surround is in the position of use.

According to a first embodiment, the support elements constitute the means of holding the sheet of glass by clamping the glass by suction on the supported face of the sheet of glass (the underside face).

According to this first embodiment, the support elements are suction cups which are connected to at least one vacuum pump. The suction cups thus hold the glass by suction on the face that rests on said suction cups.

According to a second embodiment, the support elements constitute the means of holding the sheet of glass by clamping the glass by gripping the two opposite faces of the sheet of glass.

The support elements thus constitute holding and clamping means which are intended to apply a clamping force to one or both faces of the glass, preventing any movement of amplitude of the sheet of glass when the latter is subjected to influences of vibratory movements associated with the pressures of water and air jets while it is being washed.

With regard to the embodiment involving suction cups, these may comprise elastic means of the soft foam or deformable membrane type, arranged at the interface between the termination of the suction cup intended to be in contact with the glass and the body bearing the suction cup, in order more easily to adapt to the geometry of the sheet of glass and guarantee intimate contact of the sheet of glass with regard to each of the contact surfaces of the suction cups and to make it easier to remove the sheet of glass from the surround after the drying operation.

The suction cups can be actuated in an automated manner once the sheet of glass is in place on said suction cups.

With regard to the embodiment using gripping, each support element forms a gripper intended to press against the two opposite faces of the glass, sandwiching the thickness of the sheet of glass. Each gripper is intended to apply a controlled amount of clamping so as to avoid any rupture initiator or breakage of the glass.

Each gripper comprises two opposing jaws, one of the jaws being intended to support the sheet of glass (the underside face of the sheet of glass), while the other jaw is intended to press against the opposite face (upper face) of the sheet of glass with engagement by gripping.

The upper jaw is mobile and able to be raised vertically to bring the sheet of glass from vertically above the device and into a horizontal plane until it is resting on the lower jaw.

Advantageously, each gripper comprises, between the two jaws and laterally with respect to the two jaws, and on the interior side of the gripper toward the pivot point, an end stop, preferably made of a substantially elastic material, against which the peripheral lateral edge face of the sheet of glass can rest. The material of this stop may be the same as that of the jaws or protuberances.

For preference, each jaw of a gripper comprises a plurality of spaced-apart protuberances and water removal means. The protuberances, by being spaced apart, each generate localized contacts (limiting the area of contact in order to optimize the washing) and allow water to flow and be removed.

According to a third embodiment, the support elements comprise pads and the holding means comprise means of delivering pressurized air and/or water jets (in a plane substantially perpendicular to the plane of the surround), the pressurized jets being intended to be sprayed onto the upper face of the sheet of glass which is the opposite face to the one supported by the pads.

When the support elements are in the form of pads, for preference the or some of the pads are each associated with a lateral end stop against which the edge of the sheet of glass rests.

The function performed by these pads that have a lateral end stop is to hold the sheet of glass laterally in order to avoid any movement that could be brought about by small vibrations during washing or drying.

A limited number of pads may possess such a lateral stop, such as, for example, on each side of each corner of the sheet of glass.

The pads provide a purely localized contact, generating areas of contact that are discontinuous and limited so as to avoid any traces that are visible after the glass has been washed and removed from the device.

According to a fourth embodiment, the support elements comprise spaced-apart wires extending at least between two opposite sides of the surround parallel to the direction of travel, and the holding means comprise means of delivering pressurized air and/or water jets (in a plane substantially perpendicular to the plane containing the wires), the pressurized jets being intended to be sprayed onto the upper face of the sheet of glass which is the opposite face to the one supported by the wires, so as to press the sheet of glass firmly against the support elements.

Thus, the sheet of glass intended to be conveyed is held by its underside face on the wires, and is so locally, while at the same time remaining free of any frame surrounding its periphery, which means to say that the peripheral edge of the sheet of glass is not enclosed in a structure.

Advantageously, the means of delivering pressurized air and/or water jets (of the third or fourth embodiment) correspond to air and/or water jets intended to clean the sheet of glass on the upper face thereof, whereas other jets are sprayed at the same time onto the opposite underside face, the jets sprayed onto the upper face of the sheet of glass being higher powered than the jets sprayed onto the underside face so as to ensure that the sheet of glass is pressed firmly downward and against the wires or pads despite the presence of jets sprayed onto the underside face. A positive pressure gradient between the jets aimed onto the upper face and the opposing jets aimed onto the underside face is, for example, of the order of 20%.

With regard to the pads by way of support elements, these (for example and nonlimitingly) take the form of spheres, or have a parallelepipedal or trapezoidal or pyramid-shaped geometry or even have a geometry on a spherical base provided with at least two projecting terminations or pins angularly separated at an acute angle.

Regarding the wires, these form a support surface in the manner of a net supported and tensioned via the surround in order to support the sheet of glass, whereas the pressurized jets are intended to press the underside face of the sheet of glass firmly against the wires, thus holding the sheet of glass in position and avoiding any movement of amplitude of the sheet of glass when the latter is subjected to influences of vibratory movements associated with the pressures of water and air jets while it is being washed.

The wires have sufficient tension to support the weight of the sheet of glass without these wires collapsing, at the very least without them collapsing in a plane coplanar to the end of the lower washing nozzles.

According to one feature, when the surround is in position installed on conveying means, the wires extend at least in a direction parallel to the direction of conveying.

For preference, the wires form a network of crossed wires, such as a net with a multiplicity of meshes. The wires are stretched from the four sides of the surround, between pairs of opposing sides.

Advantageously, the spacing of the wires or the width of a mesh is comprised between 10 mm and 200 mm, for preference is of the order of 50 mm.

Furthermore, each wire generates only localized contact with the periphery of the sheet of the glass because of the curvature thereof. Because the wires are located between the air or water nozzles and the sheet of glass, the number and diameter thereof is limited so as not to impede the washing and drying. The diameter of the wires is comprised between 0.5 mm and 15 mm, for preference is of the order of 1 or 2 mm.

Moreover, the wires are preferably designed to allow water to slide off and so as not to retain water. Particularly, the wires have a smooth surface (are not twisted). The material of the wires is preferably a plastics material, of the polymer type, such as polyamide, in particular of the nylon type.

According to another feature of the invention, the support elements are distributed in a balanced manner over the periphery of the surround so that the sheet of glass rests on the surround in a balanced manner.

Advantageously, the support elements apart from the wires engage against and/or in the vicinity of the two opposing lateral edges of the sheet of glass, particularly at a distance of at most 50 mm from each lateral edge of the sheet of glass toward the center thereof, and for preference at a distance of at most 20 mm or even of at most 10 mm. In practice, in particular for curved sheets of windshield glass, the distance is advantageously less than the width of the peripheral decorative black enamel (less than 20 mm); thus, any defect there might be after washing as a result of the presence of the holding element will be hidden.

The distance between two adjacent support elements (apart from the wires) is preferably comprised between 50 and 600 mm and preferably between 100 and 300 mm or 150 and 250 mm. The number and separation distance is adapted according to the dimensions of the sheet of glass.

Each support element is intended to generate a local contact with the glass such as in the form of at least one point of contact or at least one line of contact.

What is meant by "point of contact" is a contact area of at most a few $mm^2$, particularly of at most 25 $mm^2$.

What is meant by "line of contact" is an area of contact having a width of at most 3 mm. The length of the line of contact with the glass is preferably comprised between 5 and 50 mm for support elements other than the wires, in particular of the order of 30 mm.

Advantageously, the support elements (apart from the wires), particularly the areas of contact of the support elements with the glass, are made of a plastics material of the polymer type that carries no risk of scratching the glass, for example with a Shore D hardness of less than 90, and sufficiently soft, for example of soft rubber, or in particular with a Shore A hardness comprised between 20 and 80, and able to adapt to the local curvature of the glass without applying too great a reaction force to the glass.

In the first alternative form of surround for which the sheet of glass is housed inside the surround, the surround has a perimeter greater than that of the sheet of glass.

For preference, the surround has an interior contour of geometry identical to that of the sheet of glass or near-identical to that of the sheet of glass, for preference at least for the embodiments in which the support elements are other than wires.

The support elements project from the inside of the surround and (apart from the wires and therefore for the elements also forming clamping means such as suction cups and grippers, as well as the elements of the pad type) comprise areas of contact arranged in one or several planes parallel to the mid-plane of the surround.

The combined height of the surround (therefore the thickness of the surround) and of the support elements is comprised between 10 and 50 mm, for preference between 20 and 30 mm, so that the device of the invention on which the sheet of glass is intended to rest can be used in existing washing and drying facilities with reference to the space (heightwise) separating the lower nozzles from the upper nozzles intended to wash and dry the two opposite faces of the sheet of glass, the nozzles not being allowed to touch either the surround or the sheet of glass.

For preference, the method of implementing the device of the invention is as follows:
  the device for holding and capable of conveying rests via the surround on a conveyor; the sheet of glass is brought by automated means over the device so as to be deposited at the surround on the support elements, the concave face in the case of a curved sheet of glass facing toward the conveyor (downward);
  the holding means are implemented so as to hold the sheet of glass as the surround is being conveyed through the washing and drying facility.

If the holding means consist of suction cups or grippers, these are implemented in order to clamp the glass (respectively by suction or by gripping), the sheet of glass thus held then being able to undergo the washing and drying steps, while the surround is conveyed through the washing and drying facility.

In instances in which the holding means comprise means of delivering pressurized jets, these are implemented when the surround is passing through the washing and drying facility, an overpressure being obtained by applying a higher water jet and air jet pressure in the upper part of the facility, ensuring that the sheet of glass is pressed firmly against the support elements (pads or wires).

The invention also relates to an assembly comprising a conveying device and one or more holding devices of the invention, of which the surround or surrounds are borne by the conveying device without the sheets of glass resting on the conveying device, and to a washing and drying facility comprising the aforementioned assembly or at least one holding device of the invention.

The present invention is now described with the aid of examples which are purely illustrative and do not in any way restrict the scope of the invention, and on the basis of the attached illustrations in which:

FIG. 5b is an alternative form of FIG. 5a.

Figure 1:
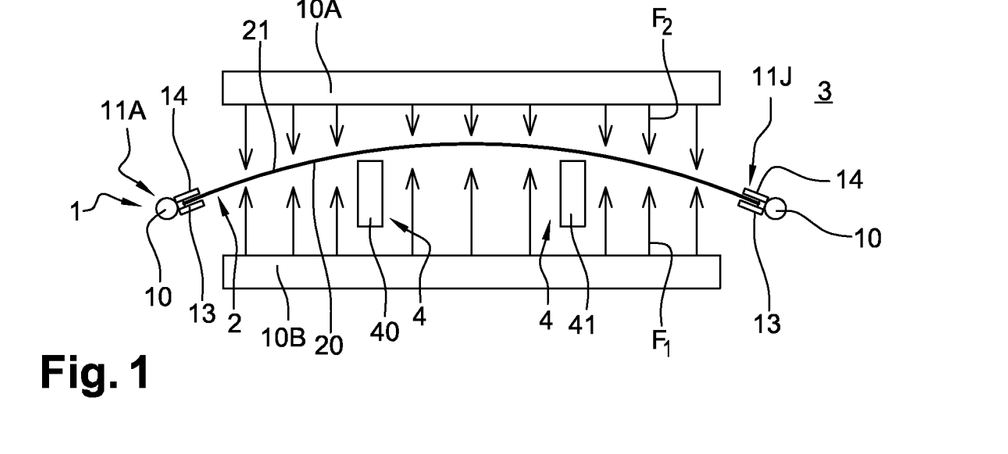
FIG. 1 depicts a schematic view in a plane (vertical plane) that is transverse with respect to a longitudinal axis of conveying, of a sheet of glass supported by the holding device of the invention in a washing facility, the support elements depicted being grippers.
Figure 2:
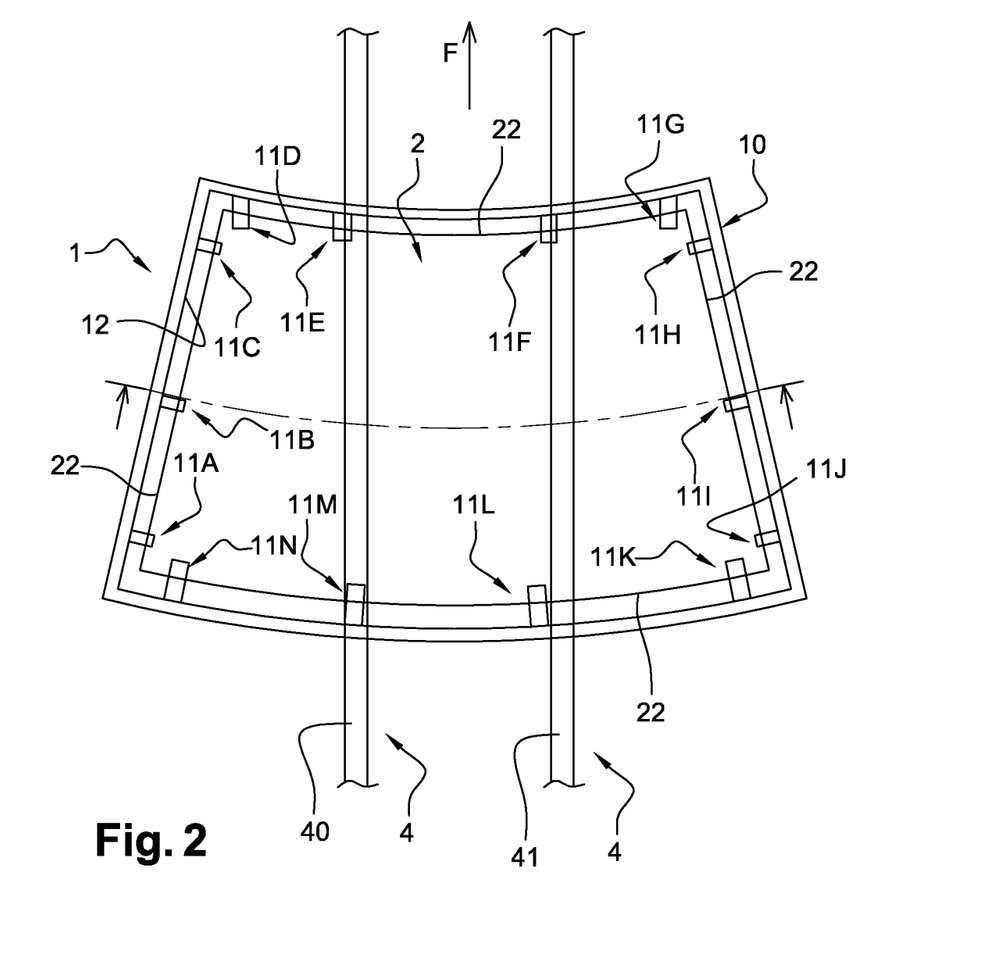
FIG. 2 is a schematic plan view of the holding device of the invention.

The device 1 of the invention for holding and capable of conveying illustrated in FIGS. 1 and 2 is intended to hold a sheet of glass 2 in a substantially horizontal plane, to convey it in a direction F and to hold it in position without any effect of amplitude or at the very least minimizing these effects of amplitude, when subjected to strong vibrations on its two faces, in particular by pressurized water and air jets.

FIG. 1 schematically illustrates in a view in cross section a conveying and air spraying facility 3 comprising a conveying system 4 comprising two parallel and spaced-apart drive belts 40 and 41, and pressurized water or air jets symbolized by the arrows F1 and F2 directed respectively vertically upward and vertically downward.

According to the invention, the device 1 for holding and capable of conveying rests horizontally on the drive belts 40 and 41 and holds the sheet of glass 2 in a horizontal plane perpendicular to the jets.

The sheet of glass has its two opposite faces, the underside face 20 and the upper face 21, extending horizontally. The underside face 20 faces downward.

For a curved sheet of glass, the underside face 20 corresponds to the concave face 20; the concavity of the sheet of glass therefore faces downward, which means to say faces the conveyor 4.

With reference to FIG. 2, the device 1 for holding and capable of conveying comprises a surround 10 and a plurality of support elements 11A to 11N which are secured to and project from the interior periphery 12 of the surround.

The surround 10 is made for example from four tubular profile sections joined together.

Advantageously, the surround 10 has its interior contour 12 identical or substantially similar in geometry to the geometry of the sheet of glass. It too has a curvature which follows that of the sheet of glass.

The support elements 11A to 11N are distributed over the periphery of the surround in a balanced manner.

The sheet of glass 2 is positioned on or between each support element 11A to 11N.

Each support element engages locally, particularly via points of contact or lines of contact, with at least the underside face 20 of the sheet of glass.

In the embodiment of FIGS. 1 and 2, clamping is obtained by gripping of the sheet of glass, the holding elements taking the form of grippers illustrated in FIGS. 3a to 4b.

Figure 5A:
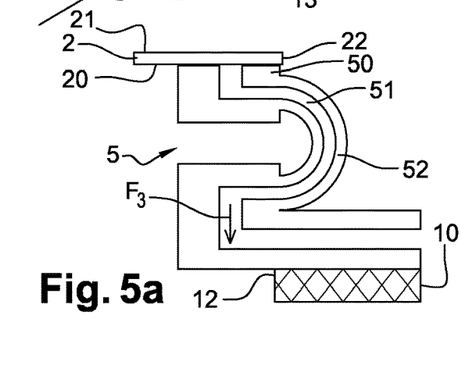
FIG. 5a is a detailed view in cross section of another embodiment of a support element, in the form of a suction cup.
Figure 5B:
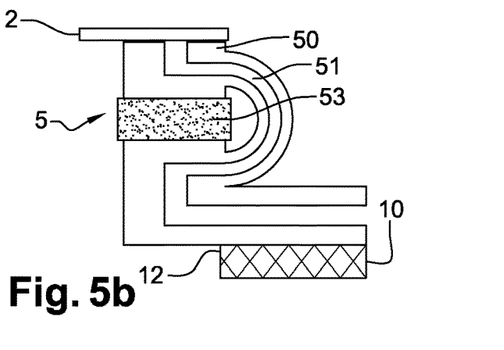

According to another embodiment, clamping is achieved by suction on the underside face of the sheet of glass, the holding elements taking the form of suction cups 5, as illustrated in FIGS. 5a and 5b.

According to yet another embodiment, the support elements take the form of pads (FIGS. 6a to 6c) on which the sheet of glass 2 is intended to rest, and the device comprises means 10A, 10B of delivering pressurized jets (FIG. 1) at least to the upper part, in order to press the sheet of glass firmly against the pads. When the sheet of glass is subjected to the washing or drying jets, the upper jets F2 apply a higher pressure than the lower jets F1, so as to press the sheet of glass 2 firmly against the pads and minimize the risk of this sheet oscillating.

According to a final embodiment (FIG. 7), the support elements take the form of taut wires 7 connecting at least two opposite sides of the surround 10, and the device comprises means 10A, 10B (FIG. 1) of delivering pressurized jets at least to the upper part, so as to press the sheet of glass firmly against the wires. When the sheet of glass is subjected to the washing or drying jets, the upper jets F2 apply a higher pressure than the lower jets F1, so as to press the sheet of glass 2 firmly against the wires and minimize the risk of this sheet oscillating.

The holding elements 11A to 11F are applied locally against the glass, as illustrated in FIG. 2, near the opposing lateral edges 22 of the sheet of glass.

In the embodiment of FIGS. 1 and 2, this collaboration of the holding elements is by gripping, and therefore on the two opposing and facing faces of the sheets of glass.

Advantageously, local engagement of the support elements apart from the wires is achieved from the lateral edge 22 of the sheet of glass or near the edge, particularly at a distance of at most 50 mm from each lateral edge of the sheet of glass toward the center thereof, and for preference at a distance of at most 20 mm or even of at most 10 mm.

In the embodiment of the elements of FIGS. 1 to 3b, each support element forms a gripper and comprises two opposing jaws, a lower jaw 13 and an upper jaw 14, which are intended respectively to engage with the underside 20 and upper 21 faces of the sheet of glass 2.

Figures 3A, 3B, 4A, 4B, 4C:
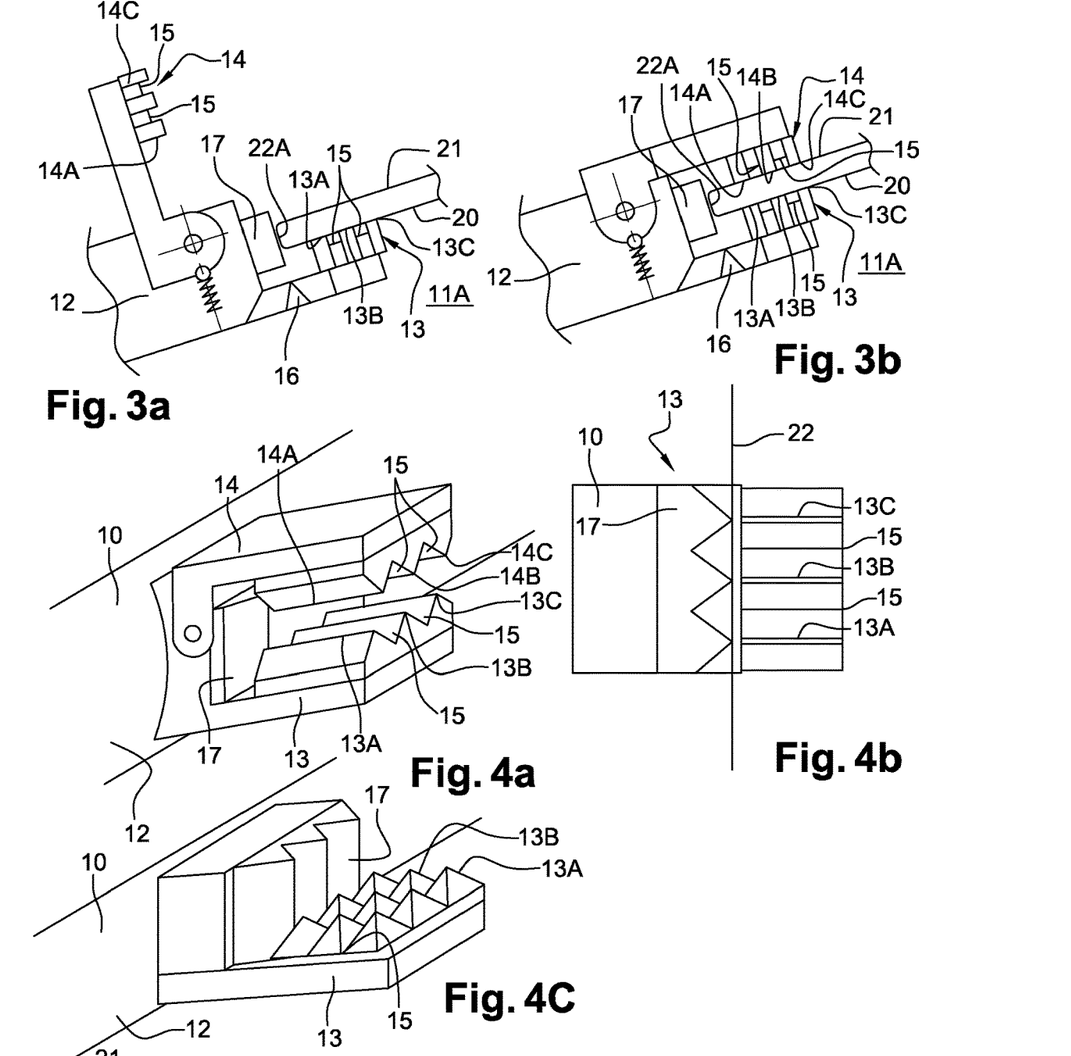
FIG. 3a is a detailed view in cross section of a support element in the form of a gripper of FIG. 1, the gripper being in the open position.
FIG. 3b corresponds to FIG. 3a, the gripper being in the position of clamping against the sheet of glass.
FIG. 4a is a perspective view of one exemplary embodiment of a gripper in the closed position.
FIG. 4b illustrates a partial schematic view from above of a horizontal section on the plane containing the upper face of the sheet of glass, of the gripper of FIG. 4a associated with the sheet of glass.
FIG. 4c is another exemplary embodiment of a jaw of a gripper.

Each jaw 13, 14 for preference comprises several lower protuberances 13A, 13B, 13C and upper protuberances 14A to 14C respectively intended to press via points of contact or via a line of contact against the faces 20 and 21 respectively of the sheet of glass 2.

The lower jaw 13 is fixed while the upper jaw 14 is mobile, for example in pivoting in a vertical plane about an axis parallel to the associated edge of the surround. The pressing of the jaws against the faces of the glass produces clamping. The clamping is tailored so that it does not generate risks of breakage or rupture initiators.

Prior to clamping, the upper jaw 14 is opened by being moved vertically (FIG. 3a), which means to say transversally to the plane in which the sheet of glass 2 is intended to extend, so that the sheet of glass can be brought from above the device and laid onto the protuberances 13A and 13B.

After the sheet of glass 2 has been applied against the lower protuberances 13A, 13B and 13C, the upper jaw 14 is swung toward the lower jaw 13 to sandwich the sheet of glass (FIG. 3b), the upper protuberances 14A to 14C coming to press against the upper face 21 of the sheet of glass. The lower protuberances 13A to 13C are arranged facing the respective upper protuberances 14A and 14C. The pressure applied by the upper jaw 14 is tailored to apply a clamping force of the order for example equivalent to a mass of 200 grams or more, which is sufficient to hold the glass in position with respect to the pressure of the water and air jets that the sheet of glass is going to experience, while at the same time avoiding a risk of breakage or rupture initiator.

Furthermore, the material of which the support elements, particularly the protuberances pressed against the glass, are made is tailored to avoid the creation of rupture initiators when the glass experiences vibrations due to washing and to drying. For preference, the material is a plastics material of the polymer type which does not risk scratching the glass, for example with a Shore D hardness of less than and advantageously soft enough, for example being made of soft rubber, or in particular of a Shore A hardness comprised between 20 and 80, able to adapt to the local curvature of the glass without exerting too great a reaction force on the glass.

In order to minimize the areas of contact with the glass and optimize the surface area washed, the protuberances 13A to 13C, 14A to 14C have contact surfaces which engage in the manner of lines of contact (view in cross section of FIG. 4b). The protuberances may extend lengthwise perpendicular or indeed parallel to the sides of the sheet of glass as illustrated in FIGS. 3a and 4b and form spaced-apart lines of contact as illustrated schematically in FIG. 4b which shows the upper protuberances 14A to 14C pressed against the glass (the upper part of the jaw is not visible in this cross-sectional view). The lines are spaced by 6 mm for example, and the width of each line is 1 mm.

The protuberances 13A to 13C and 14A to 14C are derived for example from notched or wavy surfaces (FIG. 4a) affording an alternation of ribs (protuberances) and voids 15 in alternation and parallel. In the alternative form of FIG. 4c, the protuberances form pyramids the truncated or non-truncated tips of which are intended to engage with the glass. Other geometries are conceivable, such as spheres or half-spheres even.

Each jaw 13, 14 is designed to remove the water during the washing and drying. The jaws comprise removal grooves 15 between the protuberances and in the lower part of the lower jaw a removal spout 16, substantially facing the free lateral edge 22 of the sheet of glass.

Moreover, each holding element comprises, between and laterally with respect to the two jaws 13 and 14 and on the interior side of the gripper, an end stop 17, preferably made of a substantially elastic material, against which the free peripheral edge 22 of the sheet of glass can rest. The material of the stop is in particular identical to that of the protuberances.

The actuation of the grippers of the device of the invention is performed in an automated manner.

FIGS. 5a and 5b illustrate the second alternative form of embodiment of a holding and clamping element in the form of a suction cup 5.

The suction cup 5 engages only with the underside face 20 of the sheet of glass 2. The suction cup is borne by a body projecting from the inside 12 of the surround, and has a contact termination 50 arranged in a plane parallel to the mid-plane of the surround, or which may be contained in this mid-plane.

The termination 50 of the suction cup is intended to have the underside face 20 of the sheet of glass 2 resting against it, which sheet is brought in as for the embodiment with gripper, vertically over the surround.

Like with the elements 11A to 11N, a plurality of suction cup elements 5 is distributed along the length of the four sides of the sheet of glass, this being some slight distance from the interior contour 12 of the surround.

The suction cup 5 comprises an air suction duct 51 which is connected to the termination 50 of the suction cup and opens to the outside facing the underside face 20 of the sheet of glass. This suction duct 51 is housed in a flexible pipe 52 connecting the termination 50 to the surround 10. The suction duct 51 is then extended into the surround 10 and connected to a vacuum pump (not illustrated) supported for example by the surround.

In the position for clamping of the sheet of glass a vacuum is imposed in the duct 51, sucking air in the direction of the arrow F3 and fixing the underside face 20 of the sheet of glass by suction, while at the same time controlling the pressure in order to avoid any risk of breakage or rupture initiator in the glass. The vacuum is created in such a way that a residual pressure at the interface between the glass and the suction cup is preferably comprised 0.1 and 1 bar, for example of the order of 0.5 bar.

In the alternative form of FIG. 5b, the suction cup 5 comprises, at the interface between the termination 50 and the base of the suction cup, elastic means 53, such as soft foam, so as to adapt more easily to the geometry of the sheet of glass and guarantee close application of the sheet of glass facing the entirety of the contact surface of the suction cup, and removal of the sheet of glass from the surround after the drying operation.

The contact surface of the suction cup head 50 has a diameter for example between 10 and 50 mm, a central hole of 3 mm being enough to create the vacuum. This area of contact is very small and remains localized to a few points with respect to the entirety of the surface area of the sheet of glass. This embodiment with suction cup elements is rather reserved for sheets of glass intended to constitute the sheet of glass referred to as the inner sheet in a laminated glazing, namely on the concave side in the case of a windshield, given that the part of the glass in contact with the suction cup will not in this case ultimately be the one in contact with the plastic interlayer.

Figure 6A:
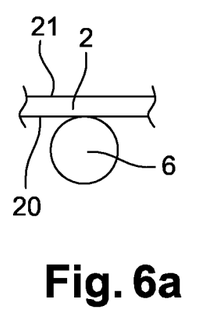
FIGS. 6a to 6c are side views of three respective alternative forms of a support element of the device of the invention in the form of pads.
Figure 6B:
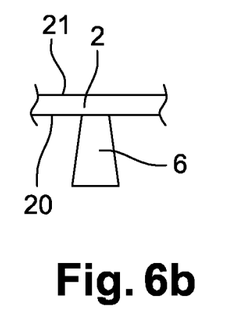
Figure 6C:
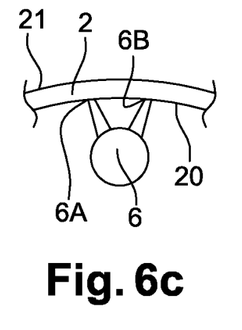

In the embodiment of the pads of FIGS. 6a to 6c, the pads 6 have, purely by way of entirely nonlimiting illustration, different shapes. The shape in FIG. 6a illustrates a sphere, the surface in contact with the glass being rounded. The shape in FIG. 6b is trapezoidal and the surface in contact with the glass is planar. FIG. 6c illustrates a spherical pad surmounted by at least two pins 6a and 6b oriented at an angle to one another. The pads could also have geometries such as the protuberances illustrated in FIGS. 4a and 4c.

Associated with these support elements which have the sole function of supporting the underside face 20 of the sheet of glass are the means 10A, 10B of delivering pressurized air and/or water jets as used at least on the side of the opposite face 21 of the glass, so as to obtain an overpressure on the upper face of the sheet of glass 21 to press the sheet of glass firmly against the pads and thus hold it in position.

In order to minimize the areas of contact with the glass so as to optimize the surface area washed, the pads have areas of contact with the glass that take the form of points of contact, preferably with a surface area of at most 25 mm$^2$.

According to the invention, the material of which the support elements in contact with the glass are made is tailored to avoid the creation of rupture initiators when the glass experiences vibrations due to washing and drying; for preference, the material is a plastics material of the polymer type, for example rubber, in particular having a hardness comprised between 20 and 90 on the Shore scale.

Figure 7:
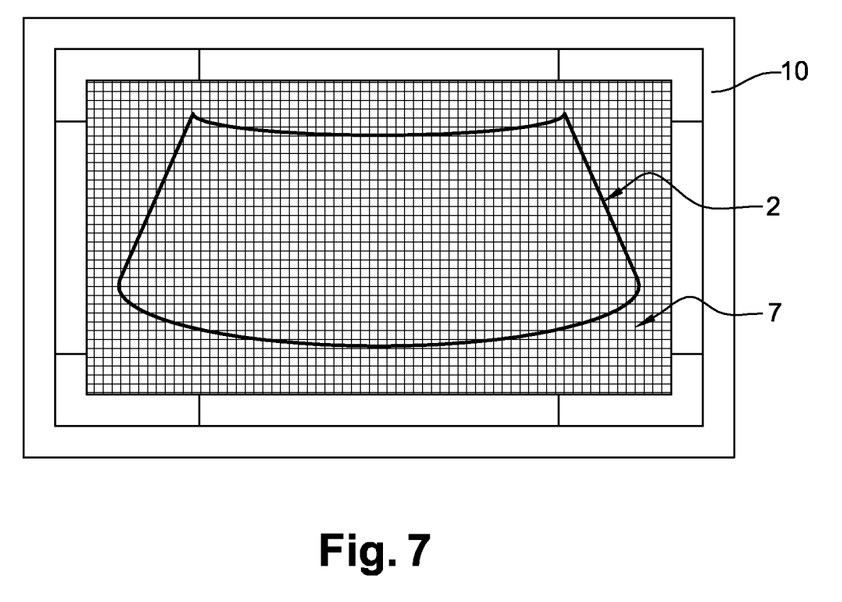
FIG. 7 is another embodiment in which the support elements are wires.

Finally, FIG. 7 illustrates an additional example of support elements in the form of a multitude of wires 7.

The wires 7 are supported and stretched between two opposing sides of the surround 10, preferably between the four sides. They form a net, in this instance preferably having criss-crossed wires.

Advantageously, the spacing of the wires or the width of a mesh of a net is comprised between 5 mm and 200 mm, for preference is of the order of 50 mm.

The diameter of the wires is limited in order to minimize the area of contact; it is comprised between 0.5 mm and 15 mm, and for preference is of the order of 2 or 1 mm.

Moreover, the wires are designed to cause the water to slip off and not to be retained. Particularly, the wires have a smooth surface (without being twisted). The material of the wires is for example a polyamide such as nylon.

Associated with the surround 10 with the wires 7 are the means 10A, 10B of delivering air and/or water jets implemented at least on the side of the upper face of the glass 21 so as to obtain an overpressure on the upper face of the sheet of glass 21 in order to press the sheet of glass firmly against the wires and therefore hold it in position. In particular, when the sheet of glass is subjected to the washing jets, the upper jets F2 apply a higher pressure than the lower jets F1, so as to press it firmly against the net 7 and minimize the risk of oscillation of the sheet of glass 2.

Each wire in contact with the sheet of glass engages with the periphery of the sheet of glass; specifically, because of the curvature of the sheet of glass and the relative flatness of the taut nets, the zones of contact of the sheet of glass 2 with the wires are limited to points of contact between the wires of the net and the periphery of the sheet of glass.

The invention claimed is:

1. A device for holding and capable of conveying a sheet of glass comprising:
   a holder configured to support the sheet of glass, the holder comprising a surround and a plurality of support elements secured to the surround which are able to support the sheet of glass locally, wherein the holder is configured to support the sheet of glass in a substantially horizontal position and such that edges of the sheet of glass are located within an interior contour of the surround, wherein the support elements comprise pads and the holder comprises a delivery system configured to deliver pressurized air and/or water jets, in a plane substantially perpendicular to the plane of the surround, the pressurized jets being constructed and arranged to be sprayed onto an upper face of the sheet of glass which is the opposite face to the one supported by the pads, wherein the delivery system corresponds to air and/or water jets intended to clean the sheet of glass on the upper face thereof, whereas other jets are sprayed at the same time onto an opposite underside face, the jets sprayed onto the upper face of the sheet of glass being higher powered than the jets sprayed onto the underside face.

2. The device as claimed in claim 1, wherein the surround is intended to surround the sheet of glass at some distance away therefrom, the surround comprising an interior contour, and the support elements are associated as projections from the interior contour of the surround.

3. The device as claimed in claim 2, wherein the interior contour of the surround has a geometry identical or near-identical to that of the sheet of glass.

4. The device as claimed in claim 1, wherein the surround bears the support elements in a plane coplanar with its upper face or in a plane situated above its upper face, when the surround is in a position of use.

5. The device as claimed in claim 1, wherein the support elements constitute a system configured to hold the sheet of glass by clamping the sheet of glass by suction on a supported face of the sheet of glass.

6. The device as claimed in claim 5, wherein the support elements are suction cups connected to at least one vacuum pump.

7. The device as claimed in claim 6, wherein each suction cup of the plurality of suction cups comprises elastic means of the soft foam or deformable membrane type, arranged at an interface between a termination of the suction cup intended to be in contact with the sheet of glass and a body bearing the suction cup.

8. The device as claimed in claim 1, wherein the plurality of support elements are a plurality of clamps, configured and arranged to hold the sheet of glass by clamping the sheet of glass by gripping two opposite faces of the sheet of glass.

9. The device as claimed in claim 8, wherein each support element of the plurality of support elements forms a gripper configured to press against the two opposite faces of the sheet of glass, sandwiching a thickness of the sheet of glass.

10. The device as claimed in claim 9, wherein each gripper comprises two opposing jaws, one of them mobile.

11. The device as claimed in claim 10, wherein each gripper comprises, between and laterally with respect to the two jaws and on an interior side of the gripper, an end stop against which the peripheral lateral edge face of the sheet of glass can rest.

12. The device as claimed in claim 10, wherein each jaw comprises a plurality of spaced-apart protuberances and a water removal device.

13. The device as claimed in claim 1 wherein the support elements comprise spaced-apart wires extending at least between two opposite sides of the surround, and the holder comprises a delivery system configured to deliver pressurized air and/or water jets, the pressurized jets being intended to be sprayed onto an upper face of the sheet of glass which is an opposite face to the one supported by the wires.

14. The device as claimed in claim 13, wherein the wires form a net in the form of a network of spaced-apart and parallel wires extending, in the position of conveying of the device, parallel to the direction of conveying or alternatively criss-crossed, comprising a multiplicity of meshes.

15. The device as claimed in claim 1, wherein the pads take a form of spheres, or have a parallelepipedal or trapezoidal or pyramid-shaped geometry or have a geometry on a spherical base provided with at least two projecting terminations or pins angularly separated at an acute angle.

16. The device as claimed in claim 1, wherein the support elements are made from a polymeric plastics material.

17. The device as claimed in claim 1, further comprising a conveying device, characterized in that the surround is borne by the conveying device without the sheet of glass resting on the conveying device.

18. The device as claimed in claim 1, wherein the sheet of glass is supported only by the plurality of support elements and only at portions of the sheet of glass proximate at least one edge of the sheet of glass.

19. A device for holding and capable of conveying a sheet of glass comprising:
   a holder configured to support the sheet of glass, the holder comprising a surround and a plurality of support elements secured to the surround which are able to support the sheet of glass locally, wherein the holder is configured to support the sheet of glass in a substantially horizontal position and such that edges of the sheet of glass are located within an interior contour of the surround, wherein the support elements comprise pads and the holder comprises a delivery system configured to deliver pressurized air and/or water jets, in a plane substantially perpendicular to the plane of the surround, the pressurized jets being intended to be sprayed onto an upper face of the sheet of glass which is the opposite face to the one supported by the pads, in combination with washing and drying jets, configured to clean sheets of glass for vehicle glazing supported by the holder.

* * * * *